US007492772B2

(12) United States Patent
Nam et al.

(10) Patent No.: US 7,492,772 B2
(45) Date of Patent: Feb. 17, 2009

(54) METHOD AND SYSTEM FOR DYNAMICALLY UPDATING ARP CACHE TABLES IN AN AD HOC NETWORK

(75) Inventors: Sang-su Nam, Seoul (KR); Min-soo Kim, Seoul (KR); Byung-in Mun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 763 days.

(21) Appl. No.: 10/886,664

(22) Filed: Jul. 9, 2004

(65) Prior Publication Data

US 2005/0007962 A1    Jan. 13, 2005

(30) Foreign Application Priority Data

Jul. 10, 2003    (KR) ...................... 10-2003-0046976

(51) Int. Cl.
H04L 12/28    (2006.01)
(52) U.S. Cl. .................................. 370/395.54; 709/242
(58) Field of Classification Search ................. 370/252, 370/395.54; 709/242
See application file for complete search history.

(56) References Cited

U.S. PATENT DOCUMENTS

| 5,758,282 | A   | * | 5/1998  | Yamashina et al. .......... 455/428 |
| 6,202,169 | B1  | * | 3/2001  | Razzaghe-Ashrafi et al. ... 714/6 |
| 6,307,843 | B1  |   | 10/2001 | Okanoue |
| 6,847,621 | B1  | * | 1/2005  | Asahina ...................... 370/331 |
| 7,200,649 | B1  | * | 4/2007  | Batke et al. .................. 709/222 |
| 2002/0147844 | A1 | | 10/2002 | Denecheau et al. |
| 2003/0076837 | A1 | |  4/2003 | Whitehill et al. |

FOREIGN PATENT DOCUMENTS

JP        8-37535 A    2/1996

(Continued)

OTHER PUBLICATIONS

"Duplicate Internet Protocol Address Detection Based on Gratuitous Address Resolution Protocol", IBM Technical Disclosure Bulletin, IBM Corp. New York, US, vol. 41., No. 1, 1998, pp. 703-705, IX000772263.

(Continued)

Primary Examiner—Seema S Rao
Assistant Examiner—Sai-Ming Chan
(74) Attorney, Agent, or Firm—Sughrue Mion, PLLC (57) ABSTRACT

A method and system for dynamically updating information registered in ARP cache tables of other terminals in a case where a protocol address of a terminal existing in an ad hoc network changes. The method includes detecting whether protocol addresses of terminals are duplicated and changing the protocol addresses of some of the terminals having the duplicate protocol addresses; by a terminal whose protocol address has changed, transmitting information on the previously used protocol address and its own hardware address to neighboring terminals; updating the address information tables in accordance with the received information; by a terminal whose protocol address has not changed among the terminals having the duplicate protocol addresses, transmitting its own address information to the neighboring terminals; and by the neighboring terminals that has received the address information in the fourth step, updating the address information tables in accordance with the received information.

20 Claims, 6 Drawing Sheets

FOREIGN PATENT DOCUMENTS

| | | |
|---|---|---|
| JP | 9-8828 A | 1/1997 |
| JP | 2001-144806 A | 5/2001 |

OTHER PUBLICATIONS

Cheshire S: "Dynamic Configuration of IPv4 Link-Local Addresses", Internet Drafts, Apr. 15, 2002, XP002264519.

Malkin: "RFC 1868: ARP Extension UNARP", Request for Comments, Nov. 1995, pp. 1-4, XP002297742.

Troll, Ryan: "draft-ietf-dhc-ipv4-autoconfig-05: Automatically choosing an IP Address In an Ad-Hoc IPv4 Network", Internet Drafts, Mar. 2, 2000, pp. 1-8, XP002297743.

* cited by examiner

<In case where packet is transmitted from terminal b to terminal e>

METHOD AND SYSTEM FOR DYNAMICALLY UPDATING ARP CACHE TABLES IN AN AD HOC NETWORK

BACKGROUND OF THE INVENTION

This application claims the priority of Korean Patent Application No. 10-2003-0046976 filed on Jul. 10, 2003 in the Korean Intellectual Property Office, the disclosure of which is incorporated herein in its entirety by reference.

1. Field of Invention

The present invention relates to a method for efficiently updating an ARP (Address Resolution Protocol) cache table in an ad hoc network, and more particularly, to a method and system for dynamically updating information registered in the ARP cache tables of other terminals when an IP (Internet Protocol) address of a terminal existing in an ad hoc network changes due to collision with other IP addresses.

2. Description of the Related Art

Figure 1:
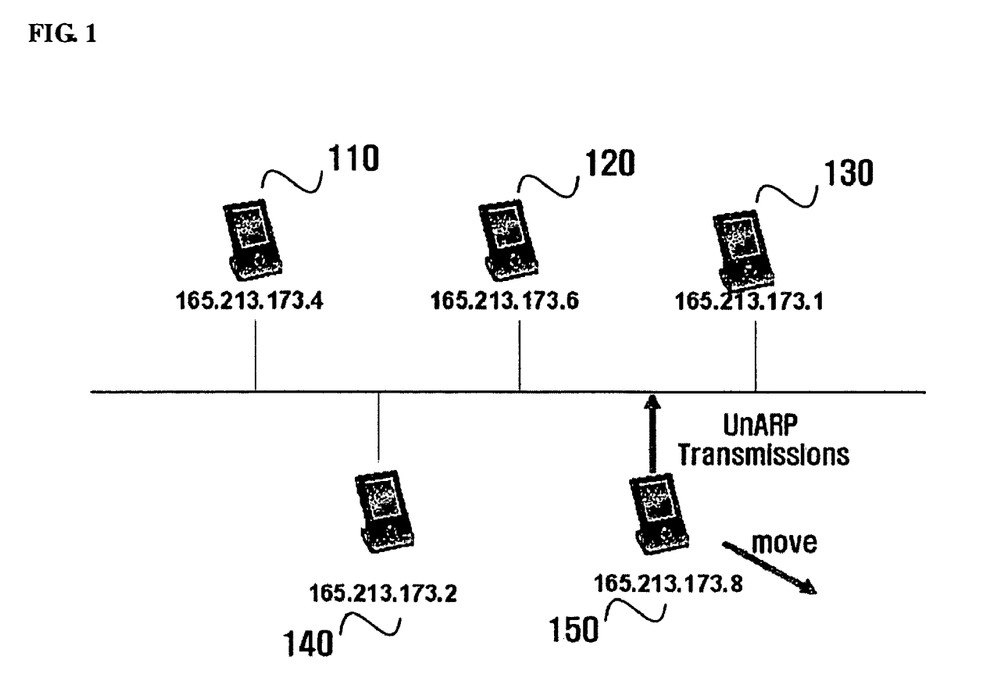
FIG. 1 illustrates an operation of a related art UnARP.

According to FIG. 1 showing the related art, when a terminal 150 existing in an ad hoc network moves by itself or gets disconnected from the ad hoc network due to a certain condition, the terminal 150 has generally broadcast an Unsolicited Address Resolution Protocol (UnARP) packet. In response to the broadcast, each of neighboring terminals 110 to 140 looks up or examines its own ARP cache table and deletes the cached IP value of the terminal 150 when it is found to be present in its own cache table. Through such a procedure, existence of hosts having different MAC (Media Access Control) addresses can be prevented in the same IP address.

Since only general wired networks are considered in the related art, it is substantially difficult to detect which host gets disconnected from a network. Currently, only draft RFC (Request for Comments) is available. The RFC means official technical documents related to Internet technologies, which are released from IETF (Internet Engineering Task Force) and offers fundamental schemes for informing new ideas about research on and standards for protocols. The Information Science Institute in the University of Southern California in U.S.A. provides a list of all searchable RFCs released from IETF. Thus, more detailed contents on ARP can be obtained from the website "http://www.rfc-editor.org/rfc.html". For example, RFC826 and RFC1868 include contents related to general ARP and UnARP, respectively.

In an ad hoc network, the IP address of a specific terminal may be changed, to avoid collision with IP addresses of terminals, and also when a terminal becomes disconnected from the network. Therefore, use of only UnARP leads to inefficiencies. Further, such a method cannot also provide solutions when packet loss occurs.

Since a MANet (Mobile Ad hoc Network) may be configured without help from any equipment such as an AP (Access Point) in the infrastructure, a protocol for assigning IP addresses, such as DHCP (Dynamic Host Configuration Protocol) used in a wired network, cannot be used. Therefore, it is necessary for a terminal to assign itself an IP address and to detect IP address duplication. However, in a MANet, duplicate IP address assignment may occur in the process of automatic IP address assignment. The ARP cache tables of the existing hosts remain unchanged when an IP address changes due to IP address collision, thereby causing a problem.

Even though the ARP cache tables are designed to be updated after a predetermined time period, normal communications cannot be made during the period because of incorrect ARP cache tables due to the change in IP address. The time period required for updating the ARP cache tables is not specified as a standard, but the time period is within a range of 2 minutes to 4 hours. Such an update scheme is configured in such a manner that each of the terminals broadcasts a request for the IP address and MAC address to the neighboring terminals and then the neighboring terminals transmit the desired address information in a unicast response.

If a method for reducing the update time period is employed to solve the above problem, a great deal of network resources is consumed accordingly. Thus, the method is not efficient. Therefore, there is needed a method of allowing normal communications to be made by dynamically updating the ARP cache tables when the IP address have been changed.

SUMMARY OF THE INVENTION

In a case where there are two or more terminals using the same IP address in an ad hoc network, the terminals other than a single terminal should be re-assigned new IP addresses that do not duplicate existing IP address. Since ARP cache tables are not updated even when IP addresses are changed due to IP address collision, however, there may occur a case where the changed network situation is not reflected. In such a case, communications cannot be made between existing terminals and the terminals whose IP addresses have been changed.

The present invention addresses the aforementioned problem. An aspect of the present invention is to dynamically update ARP cache tables by causing a terminal whose IP address remains unchanged to send its own address information to existing terminals using gratuitous ARP.

Further, the present invention proposes a new ARP message, selective UnARP. Another aspect of the present invention is to dynamically update ARP cache tables by allowing wrong address information to be selectively deleted from ARP cache tables of the existing terminals using the selective UnARP.

Consistent with an aspect of the present invention, there is provided a method for dynamically updating address information tables in an ad hoc network, comprising a first step of detecting whether protocol addresses of terminals are duplicated and changing the protocol addresses of some of the terminals having the duplicate protocol addresses; a second step of, by a terminal whose protocol address has changed, transmitting information on the previously used protocol address and its own hardware address to neighboring terminals; and a third step of, by the neighboring terminals that have received the address information, updating the address information tables in accordance with the received information.

Consistent with another aspect of the present invention, there is provided a method for dynamically updating address information tables in an ad hoc network, comprising a first step of detecting whether protocol addresses of terminals are duplicated and changing the protocol addresses of some of the terminals having the duplicate protocol addresses; a second step of, by a terminal whose protocol address has not changed among the terminals having the duplicate protocol addresses, transmitting its own address information to neighboring terminals; and a third step of, by the neighboring terminals that have received the address information, updating the address information tables in accordance with the received information.

Consistent with a further aspect of the present invention, there is provided a method for dynamically updating address information tables in an ad hoc network, comprising a first step of detecting whether protocol addresses of terminals are duplicated and changing the protocol addresses of some of the terminals having the duplicate protocol addresses; a second step of, by a terminal whose protocol address has changed, transmitting information on the previously used protocol address and its own hardware address to neighboring terminals; a third step of, by the neighboring terminals that have received the address information, updating the address information tables in accordance with the received information; a fourth step of, by a terminal whose protocol address has not changed among the terminals having the duplicate protocol addresses, transmitting its own address information to the neighboring terminals; and a fifth step of, by the neighboring terminals that has received the address information in the fourth step, updating the address information tables in accordance with the received information.

Consistent with a still further aspect of the present invention, there is provided a system for dynamically updating address information tables in an ad hoc network, comprising a first terminal whose protocol address is changed using an automatic address assignment function on the ad hoc network when the protocol address is duplicated between terminals, and neighboring terminals located within positions where the neighboring terminals can communicate directly with the first terminal, wherein the first terminal transmits information on the previously used protocol address and its own hardware address, and the neighboring terminals update the address information tables in accordance with the received information.

BRIEF DESCRIPTION OF THE DRAWINGS

The above and other aspects, features and advantages of the present invention will become apparent from the following description of an exemplary embodiment given in conjunction with the accompanying drawings, in which.

DETAILED DESCRIPTION OF THE INVENTION

Hereinafter, an exemplary embodiment of the present invention will be described with reference to the accompanying drawings.

Figure 2:
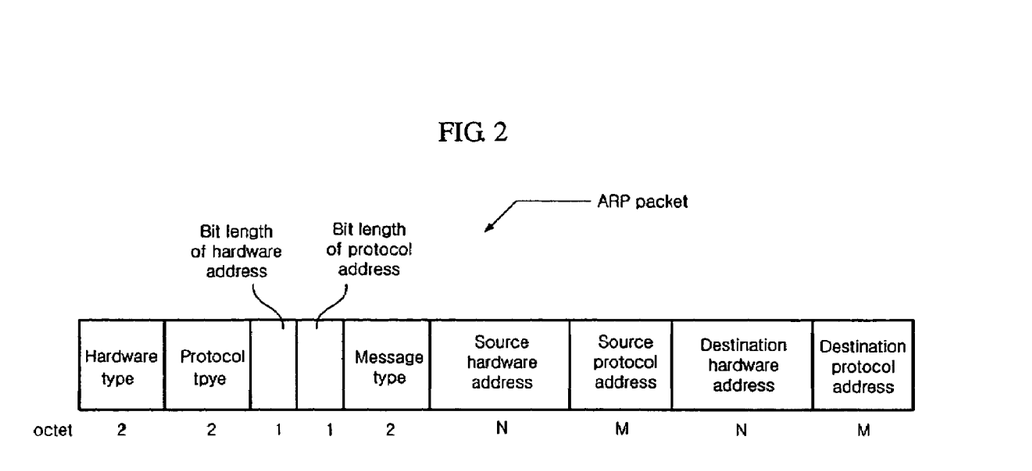
FIG. 2 illustrates a structure of the existing ARP packet.
Figure 3:
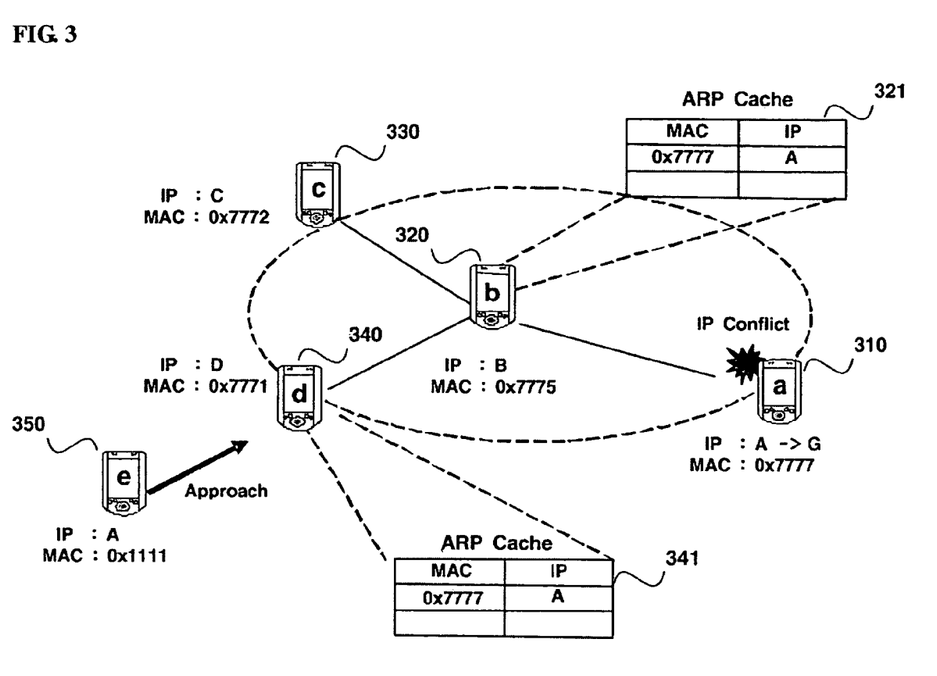
FIG. 3 illustrates an ad hoc network operating environment in which IP addresses are duplicated.

FIG. 2 illustrates the structure of an existing ARP packet. Referring to the figure, a basic format of an ARP message is used as it is, and each of the terminals is operated in an ad hoc network. The terminal is capable of automatically assigning protocol addresses such as IP addresses. Accordingly, the terminal can detect duplication of an IP address. Further, if another terminal requests a connection via the same IP address as shown in FIG. 3, the relevant terminal can detect duplicate IP addresses and assign a new IP address to the other terminal. Hereinafter, although it is described herein that the IP address is used as an example of a protocol address, the invention is not limited thereto. It should be understood that any protocol for wireless communications could also be used herein.

To correct an incorrect ARP cache, the present invention intends to use the existing gratuitous ARP. The structure of the gratuitous ARP packet will be first discussed. The gratuitous ARP packet includes a source hardware address in which a MAC address of a terminal for transmitting the gratuitous ARP packet is written, a source protocol address in which an IP address of the terminal is written, a destination hardware address in which nothing is written, and a destination protocol address in which the IP address of the terminal is written once again. The fact that the IP address of the terminal is written once again in the destination protocol address means that the gratuitous ARP packet is broadcast without specifying the destination. Therefore, the gratuitous ARP packet can be transmitted to all the terminals present within one hop in an ad hoc network.

Further, the present invention is configured in such a manner that a selective UnARP packet is added so as to allow each of the terminals to check whether the packet transmitted by the terminal itself is sent back to the terminal to form a loop, and to allow the neighboring terminals to correctly update their ARP caches when such a loop is formed. It is noted herein that the neighboring terminals refer to terminals located within one hop of the transmitting terminal. The structure of the selective UnARP packet will be later described in detail with reference to FIG. 5.

FIG. 3 illustrates an ad hoc network operating environment in which IP addresses are duplicated. This figure illustrates a case where a terminal e 350 having the same IP address A as a terminal a 310 approaches the ad hoc network when terminals 310, 320, 330 and 340 whose IP addresses are A, B, C and D, respectively, communicate with one another over the ad hoc network. First, the configuration of the ad hoc network before the terminal e 350 approaches the network is as follows. Since all the terminals are present within one hop, each of the terminals can directly transmit packets to the other terminals. Further, it is shown that the terminal d 340 and the terminal b 320 both store the IP address A and MAC address 0×7777 of the terminal since they have transmitted and received packets to and from the terminal a 310.

A case where the terminal e 350 whose IP address is A and MAC address is 0×1111 attempts to obtain access to the existing ad hoc network will be discussed. Since two different terminals each having the same IP address A are present on the network, one of the two terminals should change its own IP address and be assigned a new IP address so that there is not no collision with the previous address. In a case where the terminal a 310 having the MAC address of 0×7777 changes its own address A to a different address G, a conventional algorithm causes only the IP address of the terminal a to be changed but does not allow the neighboring terminals to update their own ARP cache tables. Thus, the ARP cache tables of the neighboring terminals, e.g. the terminal b 320 and terminal d 340, are not updated until a timer expires or ARP update information is received. Thus, the terminal b 320 or the terminal d 340 maintains their entries of <IP: A, MAC: 0×7777> that is incorrect ARP information.

Figure 4:
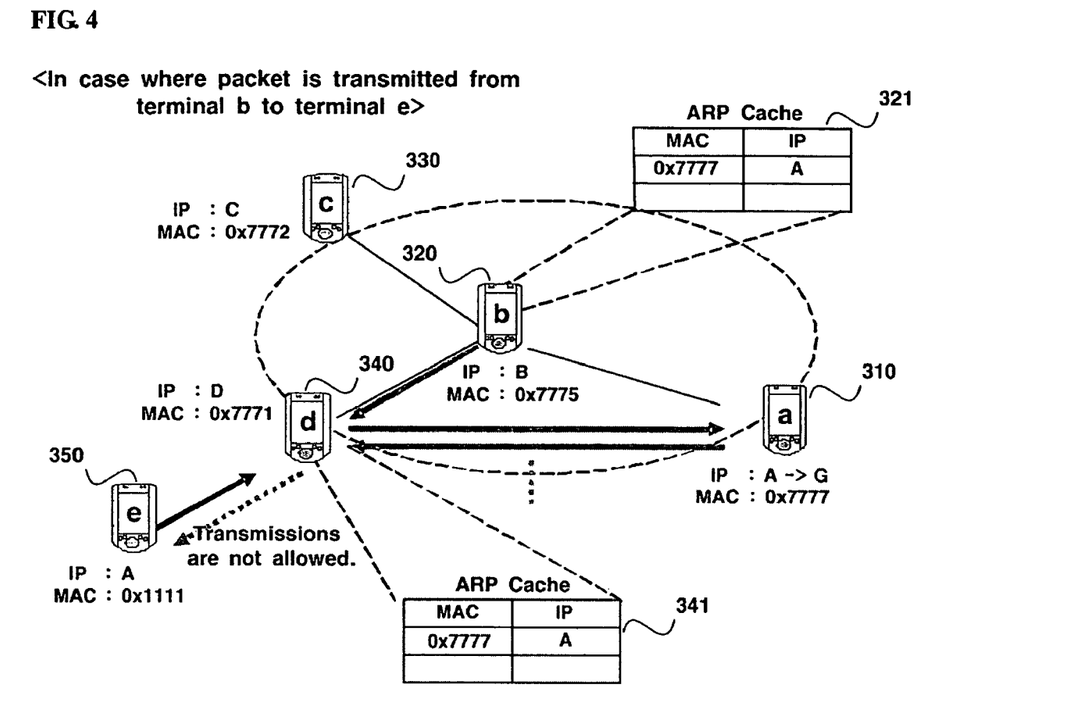
FIG. 4 illustrates how packets are transmitted when ARP cache tables have not been updated.

FIG. 4 illustrates how a packet is transmitted when the ARP cache tables are not updated. Referring to this figure, when the terminal b 320 intends to transmit a packet to the terminal e 350 having the MAC address of 0×1111, the packet should be transmitted through the terminal d 340. For this reason, the terminal b 320 sends the packet to the terminal d 340. Since an ARP cache table 341 of the terminal d 340 that has received the packet stores the MAC address 0×7777 of the IP address A, the packet is transmitted after the MAC address of the transmitted packet has been set to 0×7777. Since the terminal a 310 has the same MAC address as that of the transmitted packet but the former has a different IP address from the latter, the terminal a 310 forwards the packet to the terminal d 340.

The ad hoc network environment basically supports the communications within one hop but it is requested to have the capability of transmitting the packet beyond one hop. Therefore, when the received packet is not a packet that should be received by the terminal, the received packet is forwarded to the relevant terminal so that the packet can be transmitted to other terminals beyond one hop. However, when a specific terminal has the same MAC addresses as that of the transmitted packet but the former has the different IP address from latter, the packet may be discarded if the packet contains no information on a terminal to which the packet should be forwarded.

Further, since the packet should be transmitted through the terminal d 340 even when the terminal a 310 intends to forward the packet to the terminal e 350, the terminal a 310 first transmits the packet to the terminal d 340. Then, the terminal d 340 will transmit the packets again to the terminal a 310 on the basis of the ARP cache table 341, a "ping-pong" phenomenon may occur. As a result, the packet cannot be transmitted to the terminal e 350. Furthermore, since the terminal d 340 updates an expired timer in the ARP cache table 341 with the transmission of the packet, continuous message transmission failure may be produced.

Figure 5:
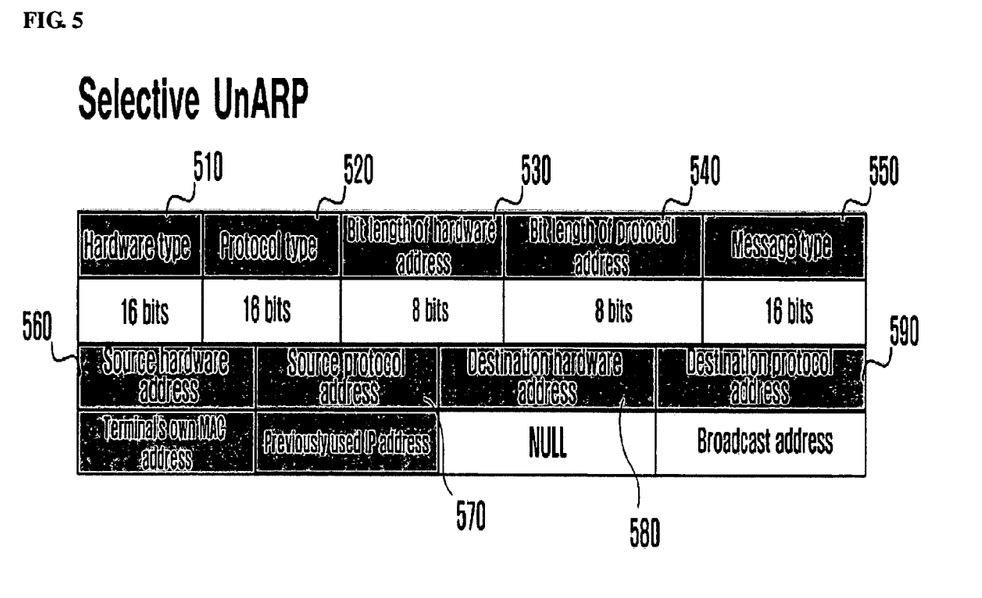
FIG. 5 illustrates a structure of a selective UnARP packet of the present invention.

FIG. 5 illustrates the structure of a selective UnARP packet of the present invention. A basic packet has the same field format as that of a typical ARP shown in FIG. 2. In a conventional UnARP, a "NULL" value is set into a hardware address field 560 by a source transmitting terminal. On the other hand, the hardware address, i.e. the MAC address of the transmitting terminal, is set into the hardware address field in the selective UnARP. In addition, the protocol address of the transmitting terminal is set into the source protocol address field 570 by the transmitting terminal in the conventional UnARP, whereas the previously used IP address is set into the source protocol address field in the selective UnARP.

The field format of the entire packet will be explained. A first 16-bit field is a hardware type field 510 into which a type of hardware such as Ethernet or Packet Radio Net is written. The following 16-bit field is a protocol type field 520 higher than the hardware type field into which an IP address is generally written. The next two fields 530 and 540 indicate address sizes of the preceding two fields 510 and 520, respectively. In the typical ARP packet, it is first determined whether a message is a request message or response message, and then, the determined message is written into the following message type field. However, since only response messages exist in the UnARP packet or selective UnARP packet, the response message is written into the selective UnARP message type field 550.

Subsequently, a MAC address of source hardware is written into the source hardware address field 560. A source protocol address has the IP address of a packet, which is incorrectly transmitted when the "ping-pong" phenomenon occurs, i.e. the IP address used before being changed. For example, when the IP address of the terminal a is changed from A to G due to the IP address collision as shown in FIG. 4, the terminal a writes its own MAC address of 0×7777 into the source hardware address of the selective UnARP packet and the previously used IP address A into the source protocol address field.

The destination hardware address field 580 is left empty. Further, a broadcast address value is placed into the destination protocol address field 590. Herein, the broadcast address value corresponds to a specific value indicating the broadcast. That is, if the specific value is set in the field, a packet can be transmitted to all the neighboring terminals capable of communicating with one another, without specifying the destination terminal.

Each of the neighboring terminals which have received the selective UnARP searches for an entry having the same IP address as that written in the source protocol address field 570 of the selective UnARP from its own ARP cache table. If the MAC address in the entry is identical to the content of the source hardware address field 560 of the selective UnARP, this entry is deleted and updated with a correct entry value. Otherwise, the entry is not deleted and remains unchanged.

For example, as shown in FIG. 4, the neighboring terminals a 320, b 330 and c 340 receive the selective UnARP packet from the terminal a. Here, the terminal b 320 and d 340 have an entry for the address A in the ARP cache table. Therefore, the terminals b 320 and d 340 search for an entry <IP: A, MAC: 0×7777> corresponding to the IP address A written into the source protocol address field 570 of the selective UnARP packet. Further, it is confirmed that a value of 0×7777 written into the source hardware address field 560 of the selective UnARP is equal to the MAC value of 0×7777 in the entry. Then, the entry is deleted, and a correct entry <IP: G, MAC: 0×7777> is added.

Consequently, since the selective UnARP packet is generated and transmitted through the aforementioned procedures, only ARP cache tables having incorrect IP and MAC addresses of the neighboring terminals can be correctly updated. Thus, undue deletion of the correctly updated entries in the ARP cache table can be prevented by using the selective UnARP packet. Simultaneously, the correct values of the entries in the ARP cache table can be dynamically maintained.

Figure 6:
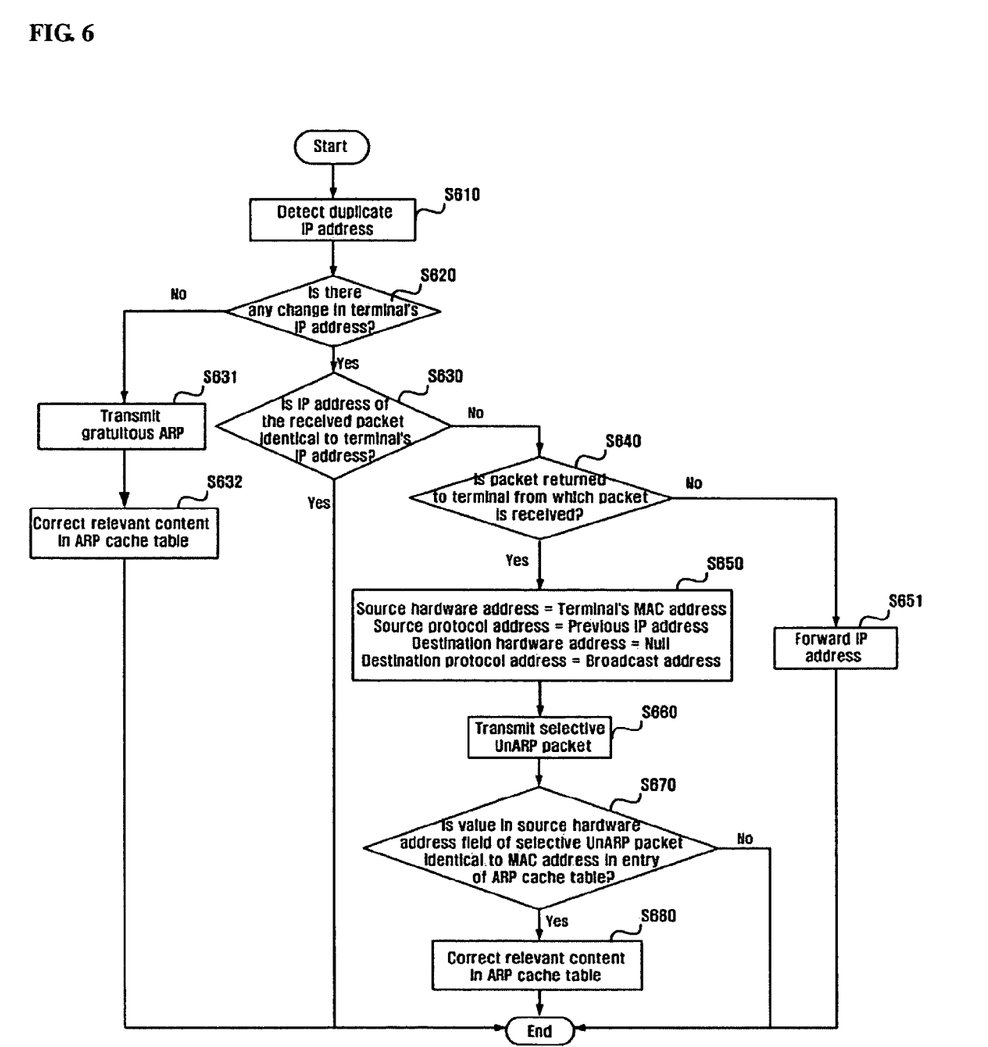
FIG. 6 illustrates a flowchart illustrating a method for updating ARP cache tables consistent with the present invention when the IP addresses are duplicated.

FIG. 6 illustrates a flowchart illustrating a method for updating the ARP cache tables according to the present invention when the IP addresses are duplicated.

First, when duplicate IP addresses are detected (S610), an automatic address assignment function is used to assign new IP addresses to some terminals having duplicate IP addresses. Then, it is determined which one of the terminals having duplicate IP addresses is a terminal whose IP address has changed or is a terminal whose IP address has not changed (S620). The terminal whose IP address remains unchanged transmits a gratuitous ARP to update ARP tables in neighboring terminals (S631). The gratuitous ARP containing the IP address and MAC address of the unchanged terminal is broadcast to the neighboring terminals so that the ARP cache tables in the terminals having the same IP and MAC addresses as those in the gratuitous ARP can be correctly updated (S632). Specifically, as shown in FIG. 4, the terminal e 350 whose IP address remains unchanged broadcasts its information <IP: A, MAC: 0×1111> to the neighboring terminals such that a value of an ARP cache table 341 in the terminal d 340 located within one hop can be correctly changed to a value of <IP: A, MAC: 0×1111>. Thus, even when the terminal b 320 intends to transmit a packet to the terminal e 350, the packet is never incorrectly forwarded to the terminal a 310 since the terminal d 340 functioning as a repeater has a correct MAC address value in the ARP cache table.

Next, when a terminal whose IP address is changed receives a packet from the neighboring terminal, it is determined whether the IP address in the received packet is identical to an IP address of the terminal (S630). If it is determined that the two IP addresses match each other, it means that the packet was correctly transmitted, and thus it causes no problem. Otherwise, the packet will be sent to the correct terminal having the IP address. If the terminal whose IP address is changed should re-transmit the packet back to a neighboring terminal that has already transmitted the packet, i.e. the "ping-pong" phenomenon occurs, a selective UnARP packet transmission process proposed by the present invention should be performed so as to ensure that the packet is transmitted to the correct terminal. If the "ping-pong" phenomenon has not occurred, the packet will be consequently forwarded to the correct terminal (S651).

The selective UnARP packet transmission process is now explained. First, the terminal whose IP address is changed writes its MAC address and the previously used IP address into the source hardware address field and the source protocol address field of the selective UnARP packet, respectively. Further, the destination hardware address field is left empty and a broadcast address is written into the destination hardware address field of the UnARP packet (S650). Then, the selective UnARP packet whose fields are filled with the predetermined values is broadcast (S660). Next, each of the neighboring terminals that have received the selective UnARP packet searches for an entry having the same IP address as that written in the source protocol address field of the selective UnARP packet from the entries in its own ARP cache table. It is then determined whether a MAC address in the searched entry is identical to a value of the source hardware address field of the selective UnARP packet (S670). If it is determined that the two values are identical, the entry is deleted, and then, an entry having the correct IP and MAC addresses of the terminal that has transmitted the selective UnARP packet is added to the ARP cache table (S680). Otherwise, the searched entry is not deleted but remains unchanged.

Although both the gratuitous ARP and the selective UnARP are used in the embodiment illustrated in FIG. 6, the two are not necessarily used together and may be used independently instead. When the IP addresses are changed due to the IP address collision, only the terminals having caused IP address collision occur can know the changes in the IP addresses. Therefore, at least one of the terminals should request its neighboring terminals to correct the incorrect IP addresses. That is, the ARP cache tables of the neighboring terminals can be dynamically maintained to have correct values by causing either the terminal whose IP address has changed to transmit the gratuitous ARP or the terminal whose IP address has not changed to transmit the selective UnARP.

As described above, even though any one of the two methods is used, the correct transmissions can be sufficiently achieved. However, since wireless communications are apt to experience unexpected problems such as packet loss as compared with wired communications, it is preferable to use both two ways for safe transmission.

Since an IP address can be assigned by a terminal itself in the ad hoc network, the IP address collision can be produced due to duplicate use of the same IP address. In the related art, however, the ARP cache table is not updated even though the IP address is changed due to the IP address collision. As a result, packets may be incorrectly sent. Consistent with the present invention, the ARP cache tables are updated using the gratuitous ARP and the selective UnARP. That is, when the above collision problem occurs, the relevant content in the ARP cache table is not unconditionally deleted but deleted and updated only when a predetermined condition is satisfied. Therefore, network resources can be more efficiently used.

Further, errors due to discrepancies between ARP cache tables of the terminals can be dynamically corrected. Therefore, more stable communications can be made even in a wireless communications environment having a higher occurrence of packet loss.

Although the present invention has been described in detail in connection with the exemplary embodiment of the present invention, the present invention is not limited thereto. It will be apparent to those skilled in the art that various changes and modifications may be made thereto without departing from the technical spirit and scope of the invention.

What is claimed is:

1. A method for dynamically updating address information tables in an ad hoc network, comprising:

detecting whether protocol addresses of terminals are duplicated and changing the protocol addresses of at least one of the terminals having the duplicate protocol addresses from a previously used protocol address to a new currently used protocol address;

by a terminal whose protocol address has changed, transmitting information on the previously used protocol address and transmitting a hardware address of the terminal whose protocol address has changed, to neighboring terminals; and by the neighboring terminals that have received the address information, updating the address information tables in accordance with the received information, wherein a selective Unsolicited Address Resolution Protocol (UnARP) packet is used to transmit the information on the protocol and hardware addresses, and wherein the selective UnARP packet comprises a destination hardware address field which is left empty.

2. The method as claimed in claim 1, wherein transmitting information on the previously used protocol address and transmitting a hardware address of the terminal whose protocol address has changed, to neighboring terminals is performed when the terminal whose protocol address has changed sends back to one of the neighboring terminals a data packet received from the one of the neighboring terminals.

3. The method as claimed in claim 1, wherein updating the address information tables in accordance with the received information comprises:

by each of the neighboring terminals that have received the address information, searching for an entry having the same protocol address as the protocol address information from the address information tables; and deleting the entry when a hardware address in the entry is identical to the hardware address information.

4. The method as claimed in claim 1, wherein updating the address information tables in accordance with the received information further comprises after the entry has been deleted, adding a new entry having correct protocol and hardware addresses of the transmitting terminal to the address information tables.

5. The method as claimed in claim 1, wherein the selective UnARP packet comprises a source hardware address field in which a (Media Access Control (MAC) address of the transmitting terminal is written, a source protocol address field in which the previously used protocol address is written, and a destination protocol address field in which a broadcast address is written.

6. A method for dynamically updating address information tables in an ad hoc network, comprising:

detecting whether protocol addresses of terminals are duplicated and changing the protocol addresses of at least one of the terminals having the duplicate protocol addresses from a previously used protocol address to a new currently used protocol address;

by a terminal whose protocol address has not changed among the terminals having the duplicate protocol addresses, transmitting an address information of the terminal whose protocol address has not changed, to neighboring terminals; and by the neighboring terminals that have received the address information, updating the address information tables in accordance with the received information, wherein a gratuitous Address Resolution Protocol (ARP) packet is used to transmit the address information, and wherein the gratuitous ARP packet comprises a destination hardware address field which is left empty.

7. The method as claimed in claim 6, wherein the gratuitous ARP packet comprises a source hardware address field in which a MAC address of the transmitting terminal is written, a source protocol address field in which the protocol address of the transmitting terminal is written, and a destination protocol address field in which the protocol address of the transmitting terminal is written.

8. A method for dynamically updating address information tables in an ad hoc network, comprising:

detecting whether protocol addresses of terminals are duplicated and changing the protocol addresses of at least one of the terminals having the duplicate protocol addresses from a previously used protocol address to a new currently used protocol address;

by a terminal whose protocol address has changed, transmitting information on the previously used protocol address and transmitting a hardware address of the terminal those protocol address has changed, to neighboring terminals;

by the neighboring terminals that have received the address information, updating the address information tables in accordance with the received information;

by a terminal whose protocol address has not changed among the terminals having the duplicate protocol addresses, transmitting its own address information to the neighboring terminals; and by the neighboring terminals that have received the address information in the fourth step, updating the address information tables in accordance with the received information, wherein a selective Unsolicited Address Resolution Protocol (UnARP) packet is used to transmit the information on the protocol and hardware addresses, and wherein the selective UnARP packet comprises a destination hardware address field which is left empty.

9. The method as claimed in claim 8, wherein transmitting information on the previously used protocol address and transmitting a hardware address of the terminal those protocol address has changed, to neighboring terminals is performed when the terminal whose protocol address has changed sends back to one of the neighboring terminals a data packet received from the one of the neighboring terminals.

10. The method as claimed in claim 8, wherein updating the address information tables in accordance with the received information further comprises:

by each of the neighboring terminals that have received the address information, searching for an entry having the same protocol address as the protocol address information from the address information tables; and deleting the entry when a hardware address in the entry is identical to the hardware address information.

11. The method as claimed in claim 8, wherein updating the address information tables in accordance with the received information comprises, after the entry has been deleted, adding a new entry having correct protocol and hardware addresses of the transmitting terminal to the address information tables.

12. The method as claimed in claim 8, wherein the selective UnARP packet comprises a source hardware address field in which a MAC address of the transmitting terminal is written, a source protocol address field in which the previously used protocol address is written, and a destination protocol address field in which a broadcast address is written.

13. The method as claimed in claim 8, wherein a gratuitous ARP packet is used to transmit the address information, and wherein the gratuitous ARP packet comprises a source hardware address field in which a MAC address of the transmitting terminal is written, a source protocol address field in which the protocol address of the transmitting terminal is written, and a destination protocol address field in which the protocol address of the transmitting terminal is written.

14. The method as claimed in claim 1, wherein the address information tables are ARP cache tables of the terminals.

15. A system for dynamically updating address information tables in an ad hoc network, comprising:

a first terminal whose protocol address is changed from a previously used protocol address to a new currently used protocol address using an automatic address assignment function on the ad hoc network when the protocol address thereof is duplicated; and neighboring terminals located within positions where the neighboring terminals can communicate directly with the first terminal, wherein the first terminal transmits information on the previously used protocol address and its own hardware address, and the neighboring terminals update the address information tables in accordance with the received information, wherein a selective UnARP packet is used to transmit the address information, and wherein the selective UnARP packet comprises a destination hardware address field which is left empty.

16. The system as claimed in claim 15, wherein transmission of the address information to neighboring terminals by the first terminal is performed where the first terminal whose address has changed transmits a data packet received from one terminal among the neighboring terminals again to the one terminal.

17. The system as claimed in claim 15, wherein the selective UnARP packet comprises a source hardware address field in which a MAC address of the first terminal is written, a source protocol address field in which the previously used protocol address is written, and a destination protocol address field in which a broadcast address is written.

18. The system as claimed in claim 15, further comprising a second terminal whose protocol address has not changed even when the protocol address is duplicated between the terminals, wherein the second terminal transmits its own address information to terminals located within positions where the terminals can communicate directly with the second terminal.

19. The system as claimed in claim 18, wherein a gratuitous ARP packet is used to transmit the address information, and wherein the gratuitous ARP packet comprises a source hardware address field in which a MAC address of the second terminal is written, a source protocol address field in which the protocol address of the second terminal is written, and a destination protocol address field in which the protocol address of the second terminal is written.

20. The system as claimed in claim 15, wherein the address information tables are ARP cache tables of the terminals.

* * * * *